April 10, 1928.  1,666,013
W. H. JACKSON
MEANS FOR STERILIZING BEARINGS FOR SHAFTINGS
Filed June 2, 1920  3 Sheets-Sheet 1

April 10, 1928.

W. H. JACKSON 1,666,013

MEANS FOR STERILIZING BEARINGS FOR SHAFTINGS

Filed June 2, 1920   3 Sheets-Sheet 2

INVENTOR
William H. Jackson
BY
Stewart Perry
his ATTORNEYS

April 10, 1928.  1,666,013

W. H. JACKSON

MEANS FOR STERILIZING BEARINGS FOR SHAFTINGS

Filed June 2, 1920  3 Sheets-Sheet 3

William H. Jackson INVENTOR

BY Stewart Perry

ATTORNEYS

Patented Apr. 10, 1928.

1,666,013

UNITED STATES PATENT OFFICE.

WILLIAM H. JACKSON, OF DOUGLASTON, NEW YORK.

MEANS FOR STERILIZING BEARINGS FOR SHAFTING.

Application filed June 2, 1920. Serial No. 386,043.

This invention has reference to means for cleaning, renovating and sterilizing bearings and shafting used in connection with churns, sterilizers and agitators of various types and for various purposes, and particularly has reference to a means by which shafting and its bearings may be cleaned, sterilized and purified quickly and with facility after each operation or as often as may be deemed necessary for sanitary reasons.

It should be understood that heretofore, in sterilizers, churns and agitators of usual or well-known types, it has been impossible to thoroughly clean, sterilize and purify the shafting and bearings therefor without disassembling or taking apart the elements constituting the bearings, bushings, etc., for the driving-shaft, thus causing serious and expensive delays in operation and entailing the employment of skilled mechanics thoroughly acquainted with the mechanism. Accidental loss of parts entails further expense and loss of time, thus making the present method of cleaning and sterilizing the shafting and bearings and the tanks or receptacles expensive, laborious and annoying. Moreover, the matter of lubrication of the shafting and bearings presents a serious problem which has to be dealt with in apparatus of the kind referred to, since lubricating oil, or other lubricant, must not be permitted to reach the liquid being treated and must be so applied as to avoid contamination of the liquid in the tank. By the employment of my invention, the usual lubricant is applied to bearings remote from the tank, and the shafting and its bearings adjacent the tank are lubricated by the liquid under treatment. Thus, all the objections, difficulties and expense are eliminated.

Among the objects of my invention may be noted the following: to provide means by which shafting, bushings and bearings of agitators, churns and similar apparatus may be quickly and easily cleansed, sterilized and purified; to accomplish the foregoing objects without disassembling or disjointing any of the parts of the apparatus; to provide a thorough and efficacious mode of cleaning and sterilizing shafting and its bearings in apparatus of all kinds where such requirements are an essential to continuing operation; to provide means for preventing the liquid being treated in churns, sterilizers, etc., from being contaminated by lubricant used on the machinery; to provide for utilizing the liquid being treated as a lubricating means and subsequently purifying the bearings so as to remove all source of contamination preparatory to again using the apparatus; and to provide simple, economical, effective, strong and durable means for carrying out the foregoing objects and producing the functions noted.

My invention is particularly applicable to tanks wherein milk is placed for storage. It is a well known fact that to preserve milk in marketable form it must not be permitted to remain quiescent, but must be kept in a state of agitation. Heretofore in devices of this nature a shaft bearing suitable paddles has been mounted in an aperture in the base of the tank and bearing for the shaft has been mounted in this aperture with suitable packing interposed between the fluid and the bearing to prevent the contamination of the milk or other fluid contained within the tank by reason of the lubrication of the bearings of the shaft. However, it has been found difficult to prevent the seepage of oil from such bearings into the tank or to prevent the seepage of milk into the bearings, the result in one case being a possible infection of the milk and in the other case, the befouling of the bearings. To overcome this difficulty it has been found necessary, after the tank is emptied of its contents, to remove the bearings for the purpose of cleansing the same. This is an elaborate and difficult process requiring time and careful readjustment. My present invention is addressed particularly to the providing of means whereby this difficulty will be overcome. I accomplish the same by suspending from the base of the tank an independent bearing for the shaft, remote from the tank, I then provide a bushing to fill and close the aperture in the tank and at the same time form a bearing for the shaft, such bushing being so constituted that fluid within the tank may seep into such bearing and become a lubricant therefor. I then provide means by which live steam or other sterilizing fluid may be introduced into said bushing bearing and withdrawn therefrom in such a way as to thoroughly sterilize and cleanse the bushing bearing. Between the bushing bearing and external bearing I interpose packing adapted to exclude the lubrication of the external bearing from the bushing bearing, and at the same time to prevent the liquid seeping from the tank through the bushing bearing from entering and contaminating the external bearing.

With the foregoing objects in view, and others which will be detailed during the course of this description, my invention consists in the parts, features, elements and combinations thereof hereinafter described and claimed.

In order that my invention may be clearly understood, I have provided drawings wherein.

Figure 1:
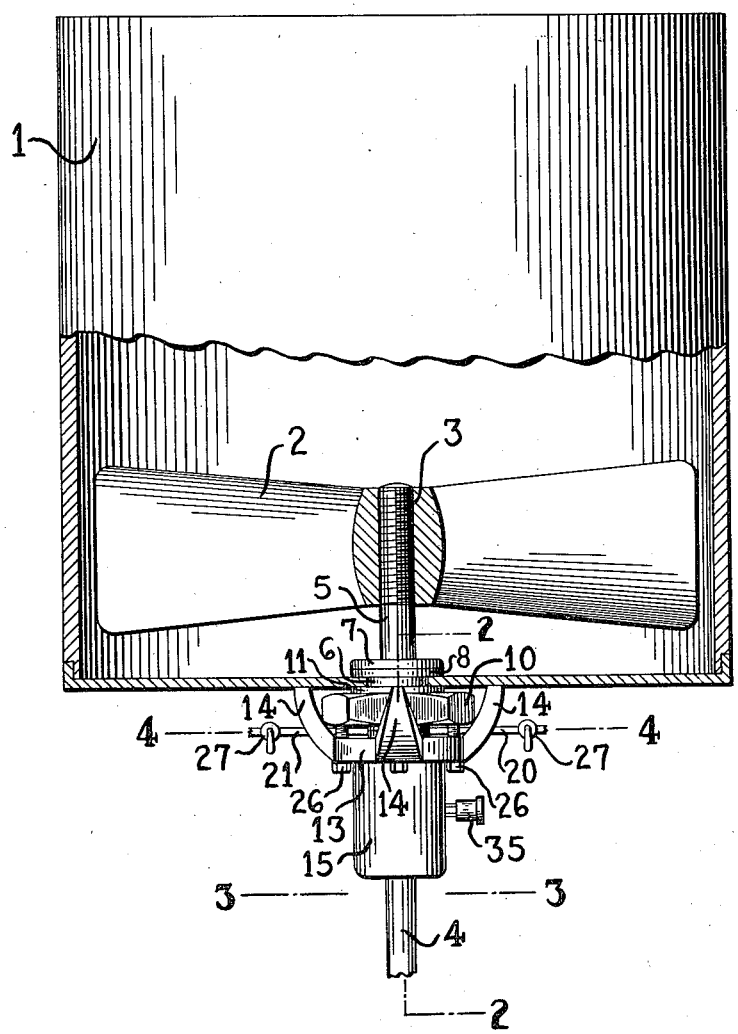
Figure 1 is a sectional elevation of so much of an apparatus as is deemed necessary to illustrate my invention, a portion of the tank or receptacle being broken away to show interior parts.
Figure 2:
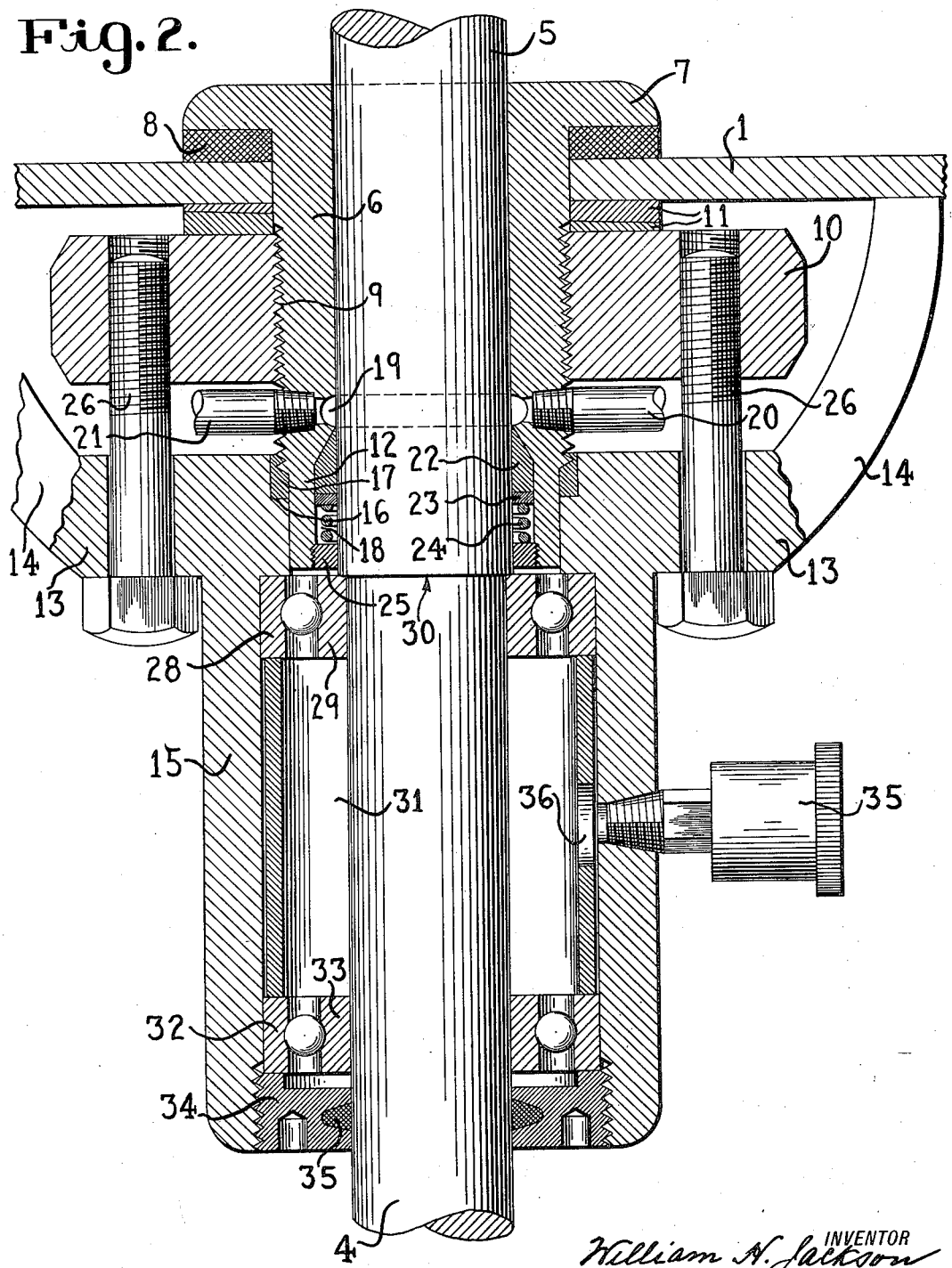
Figure 2 is a vertical, central section of the shafting, bushing and bearings, on an enlarged scale, shown in Figure 1, the section being taken substantially on the line 2—2 of Figure 1.
Figure 3:
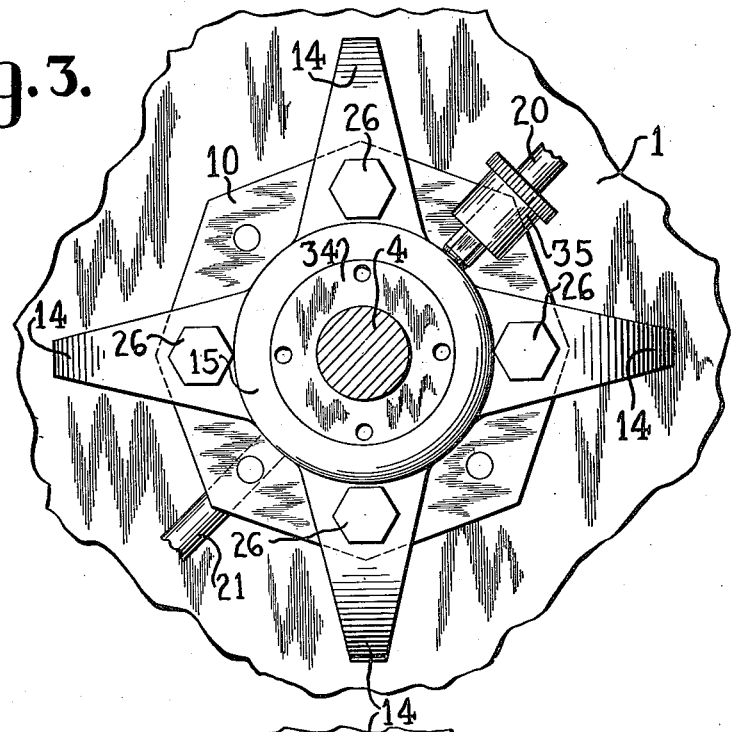
Figure 3 is a horizontal section, on an enlarged scale, of the thrust bearing, shafting and renovating means embodying my invention, the section being taken on the line 3—3 of Figure 1, and the tank being broken away.
Figure 4:
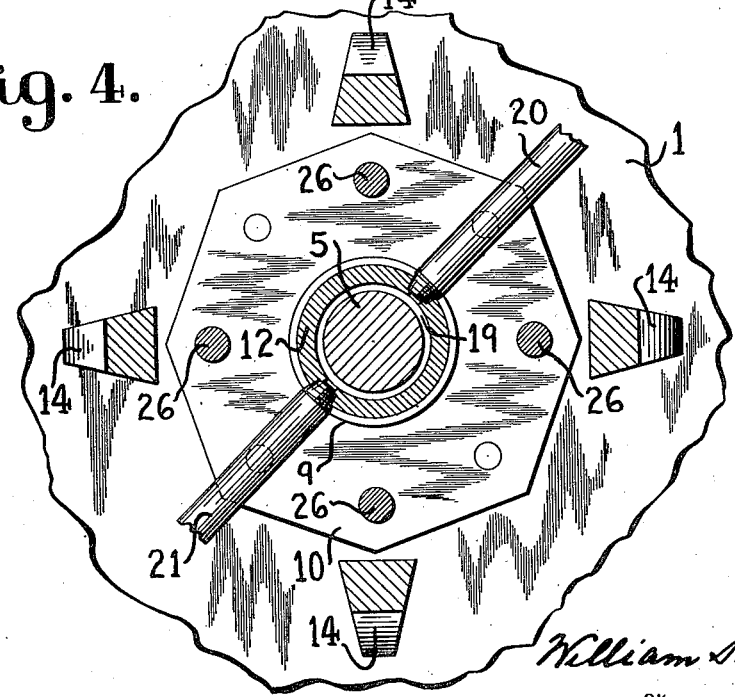
Figure 4 is a view similar to Figure 3, the section being taken on the line 4—4 of Figure 1.

Referring to the drawings, the numeral 1 indicates any suitable receptacle, vat or tank adapted to receive liquid to be churned, agitated, sterilized or treated in similar manner, as by a paddle, churn or dasher 2 securely held upon the screw-threaded end 3 of a shaft 4, which extends through the bottom of the said tank, as shown in Figure 1. The enlarged upper end 5 of the shaft 4, which carries the paddle 2, extends through a bushing 6, the enlarged circular head 7 of which overlaps the tank bottom 1 and has between the same and the tank bottom the packing 8. The major portion of the body of the bushing is screw-threaded, as at 9, on which is screwed a nut 10 between which and the bottom of the tank are clamped beveled washers 11 encircling said bushing, viz, washers whose thickness varies around the circumference, and which may be adjusted relatively by turning the same one upon the other to compensate for irregularities or uneven portions of the members adjacent thereto. The lower end 12 of the bushing is reduced in diameter and is without screw-threads, and is seated in the horizontally enlarged portion 13 of a thrust bearing having the radial arms 14 and lower cylindrical, tubular portion 15. The said enlarged portion 13 of the bearing is circumferentially shouldered, as at 16, and packing 17 is applied thereto surrounding the smooth portion 12 of the bushing, and which packing may be cut with one of more screw-threads, so that it may be held securely in place by the screw-threaded portion 9 of the bushing 6. The lower end of the bushing 6 is hollowed out to provide a chamber 18 encircling the enlarged upper end 5 of the shaft and just above said chamber the bushing is provided with a wide annular slot 19 into which, at opposite points, beveled, screw-threaded bores are entered, in which are screwed inlet and outlet pipes 20 and 21, respectively, as clearly shown in Figure 2. Within the chamber 18 of the bushing, and below the slot 19, a packing 22 is crowded, the chamber and the packing, at their upper ends, being beveled inwardly toward the shaft and slot 19 so as to prevent any fluid from passing below the said slot 19. Against the bottom of the packing 22 a washer 23 is held by the pressure of a coil spring 24 surrounding the shaft portion 5, said spring being held in place and its pressure being regulated by the spanner nut 25 screwed into the lower end of the bushing portion 12. The thrust bearing is held tightly clamped with its arms 14 against the bottom of the tank 1 and, consequently, in position to support the shaft, by means of the screw-bolts 26 passing through apertures in the portion 13 of the bearing and entering screw-threaded apertures in the nut 10. Thus the bearing can be tightly held in position to support the shank and clamped against the bottom of the tank without screws, etc., entering the latter. The pipes 20 and 21 are each provided with regulating cocks or valves 27, Figure 1, so as to control the inlet of steam and the outlet of the latter and liquid according to requirements, and as desired for cleaning, renovating and sterilizing the shafting, its bearing and surroundings. The bearing portion 15, in its upper end, is provided with any suitable form of ball-bearing member 28, the complemental member 29 of which is secured to the shaft 4 below the enlarged portion 5, the shoulder 30, formed upon the shafting providing the medium against which the bearing thrusts in order to secure the shaft with its paddle 2 in proper position in the bushing and tank, respectively. A sleeve 31 within the bearing portion 15 supports the ball-bearing member 28 and in turn is supported by the ball-bearing member 32, the complemental member 33 of which is secured to the shaft 4, and the said bearing member 32 is in turn supported by the spanner nut 34 screwed into the lower end of the bearing member 15, the said nut 34 having an annular recess in its inner circumference in which packing 35 is inserted for cooperation with the shaft 4. 35 is any suitable form of grease cup or lubricating means threaded into the bearing member 15, the aperture in which it is set cooperating with the aperture 36 in the sleeve 31. Thus the thrust bearing supports the shaft 4 in the bushing 6, and the latter supports the shaft in the tank 1.

The inlet pipe 20 is connected to any suitable steam supply, and the drain pipe 21 may be led to any suitable point for getting rid of the liquid and refuse drained from the apparatus. I have referred to the pipe 20 as the steam inlet pipe and the pipe 21 as the drain pipe; but, obviously, the pipe 21 may be used for inlet and the pipe 20 for outlet.

From the foregoing detail description, the following mode of operation will be clearly understood:

Regardless of where the shafting may be employed, or in connection with what apparatus it may be used, if at any time it becomes desirable, as in churns, sterilizers, agitators, etc., to cleanse, sterilize or otherwise renovate the shafting and surrounding bushing, as well as the inside of the tank, a steam supply will be driven through the inlet pipe 20, from which it will enter the annular slot 19 and surround the shafting and interior of the bushing, and more or less of the steam thus forced under pressure into the annular slot 19 will find its way through the bushing into the tank 1, the top of which may be closed, so as to confine the steam and enable it to clean and sterilize the interior of the tank, the paddle, the top of the bushing, and so much of the shaft as projects into the tank. It will be understood that, during the operation of the apparatus, the liquid, milk for example, will seep down between the shaft and the bushing into the annular slot or chamber 19, and will act as a sufficient lubricant for the shaft in its bush-bearing during the run of the apparatus; but, said liquid will become rancid after standing awhile and must be removed and the bearings cleansed and sterilized preparatory for a subsequent use. In operation the drain pipe is opened first, then the steam is turned on (water usually comes first until the bearing is heated up). The chamber is emptied through this drain and then the drain is closed up and the bearing is thoroughly cleaned by the increase of pressure of steam in the chamber due to closing the drain and to the presence of water and steam in the chamber which flows through the bushing and around the shaft. This passage is finally scalded after the bearing has reached a scalding temperature, by the passage of steam through these openings. Thus a thorough cleaning of the bushing and shafting and also of the chamber 19, will be accomplished and the parts will all be thoroughly sterilized. The packing 22 is purposely crowded into the bushing about the shaft to prevent any of the fluid entering the chamber 18, or passing or seeping below the latter. And it will be noted that the thrust bearing, which is the main shaft support, is located considerably away from, or quite remote from, the bushing, which is automatically lubricated by the liquid being treated.

In this specification and claims, I have referred to a sterilizing fluid, and designated live steam as suitable for the purpose. I do not intend, however, to be limited in this respect to steam or an essentially sterilizing fluid, for under some circumstances it would be possible to use water, as for instance, in the manufacture of sugar, where the water will be a solvent for the syrup that might seep through the bearings of the bushing. Under such circumstances sterilization is not necessary, but it will be sufficient to cleanse the parts and drive out foreign matter through the medium of water or other substances. I also desire to have it understood that I may employ as a medium for either sterilizing or cleansing the bearings of the bushing, any liquid, semi-liquid or gas suitable for the purpose of cleaning or sterilizing or removing foreign matter to the extent necessary for the mechanical operation as well as the operation being performed; and when I refer to a sterilizing medium or fluid in the claims, I desire that the said claims shall be read in the light of the foregoing definition.

Having thus described my invention, what I claim and desire to secure by Letters Patent is:

1. The method of cleansing and sterilizing shaft bearings which are associated with containers for treatment of liquid material and which are subject to befouling influences of the liquid material therein; which consists in injecting a sterilizing fluid into and around the bearing and causing it to flow along the shaft therein whereby to remove or dislodge the befoulment therein.

2. A device of the character described comprising, in combination, a container for fluid or liquid material to be treated, activating means arranged to operate on the fluid or liquid material including an actuating element extending into the container, a bearing for said actuating element associated with the container and exposed to contaminating or befouling influences of the fluid or liquid being treated therein, and means for introducing a cleansing or sterilizing fluid under pressure into the bearing about the actuating element to cause it to travel along and about said actuating element and remove or sterilize the befoulment.

3. A device of the character described comprising, in combination, a container for liquid material to be treated, activating means for operating on the liquid material including an actuating element extending into the container, a bearing for said actuating element associated with the container and exposed at one end to befouling or contaminating influences of the liquid in the container, a conduit entering the bearing at a point substantially removed from the exposed end to admit cleansing or sterilizing fluid under pressure to the bearing between said actuating element and its supporting bearing surface and means to constrain the flow of cleansing or sterilizing fluid along and around the actuating element through the exposed end of the bearing whereby to remove or sterilize the befoulment.

4. In a bearing exposed at one portion to befouling and contaminating influences of a fluid which is detrimental to the bearing under usual circumstances, a conduit solely for the admission of cleansing or sterilizing fluid entering the bearing at a portion removed from the exposed portion and means to cause the cleansing or sterilizing fluid to travel along and around the shaft in the bearing between it and the supporting bearing surface to remove or sterilize such befoulment.

5. A device of the character described comprising, in combination a container for liquid material to be treated, a rotary agitator in the container having a shaft extending through one wall thereof, a bearing for said shaft associated with said wall and exposed to contaminating or befouling influences of the liquid within the container, a conduit for cleansing or sterilizing fluid under pressure entering the bearing at a point substantially removed from the wall of the container, said conduit substantially surrounding the shaft, and means to constrain the flow of the cleansing or sterilizing fluid along and around the shaft into the container to remove or sterilize the befoulment after the treated liquid is removed.

6. The method of cleansing and sterilizing shaft bearings which are subjected to befouling influences which consists in injecting steam into a chamber surrounding the shaft, momentarily discharging condensate and local befoulment from the chamber and then closing the discharge after the bearing is locally heated to cause the steam to pass from the chamber along the shaft between it and the supporting bearing surface.

Signed by me at New York this 27 day of May, 1920.

WILLIAM H. JACKSON.